United States Patent Office 3,235,493
Patented Feb. 15, 1966

3,235,493
PROCESS FOR CLARIFYING SUSPENSIONS
Josef Kaupp, Erich Hambsch, and Herbert Salomon, Gersthofen, near Augsburg, Germany, assignors to Farbwerke Hoechst Aktiengesellschaft vormals Meister Lucius & Brüning, Frankfurt am Main, Germany, a corporation of Germany
No Drawing. Filed May 7, 1963, Ser. No. 278,768
Claims priority, application Germany, May 12, 1962, F 36,789
8 Claims. (Cl. 210—54)

The present invention relates to a process for clarifying aqueous suspensions of solid particles by sedimentation.

It is necessary for the protection of surface waters to detoxicate and purify industrial waste waters. The waste waters often contain finely dispersed solid particles, for example chemicals or carbon particles and dissolved organic and inorganic impurities such as metal salts. Many of these metal salts can be precipitated by means of chemical reagents. By this means suspensions are formed in which the solid particles settle very slowly or which are scarcely filterable.

In order to accelerate the sedimentation or to facilitate the filtration, for example for the recovery of valuable solids, it is known to use organic flocculating agents, such as starch derivatives, cellulose ethers and various water-soluble natural products. Moreover, there have been proposed for this purpose polyacrylates, polyacrylamide, copolymers of vinyl acetate and maleic acid, polyamines, polyethers and polystyrene sulfonic acid.

The action of such substances on colloids and dispersed matter can be explained by different hypotheses; it is mainly based on intermolecular forces, substantially electrostatic and/or adsorptive effects.

It has now been found that suspensions of solid particles can be clarified with special advantage with the use of water-soluble, highly polymeric hydroxycarboxylic acids as obtained by treating polyacrolein and/or polymethacrolein and/or copolymers of acrolein and/or copolymers of methacrolein with strong bases. These hydroxycarboxylic acids have a surprisingly good action as flocculation auxiliaries.

The hydroxycarboxylic acids to be used in the process of the invention, which may contain besides hydroxyl groups and carboxyl groups, further functional groups, are dismutation products of polyacrolein, polymethacrolein, or of copolymers of acrolein or methacrolein with other polymerizable organic substances in the sense of a Cannizzaro reaction, as described, for example, in German Patents 1,024,714 and 1,054,714. The hydroxycarboxylic acids are prepared by reacting the respective polymer or copolymer with a water-soluble inorganic or organic base, the dissociation constant of which is greater than that of ammonium hydroxide, at moderately elevated temperatures, for example in the range of from 20 to 100° C. or higher. In this reaction, compounds are obtained in which the originally occuring aldehyde groups have been transformed wholly or partially by dismutation into hydroxymethyl groups and carboxyl groups. Alternatively, the aforesaid polymers or copolymers can be first treated with a known agent capable of shielding the free aldehyde groups and the derivatives obtained can then be subjected to a treatment with bases. Thus, it is possible, for example, first to transform with sodium bisulfite part of or all of the aldehyde groups of the polymer or copolymer into aldehydebisulfite groups and to subject the product obtained to the Cannizzaro reaction, whereby the desired hydroxycarboxylic acids are likewise obtained.

It is possible, but not necessary, to subject the polymers or copolymers to a complete Cannizzaro reaction. In many cases it is sufficient to add to the polymer or copolymer the base in such a stoichiometric deficiency that part of the free aldehyde groups or of the aldehyde-bisulfite groups is maintained.

A part of the free aldehyde groups or aldehyde-bisulfite groups of the polymers or copolymers used can also be transformed, prior to or during the treatment with bases, in known manner into functional groups which are characteristic of aldehyde groups. Thus, the aldehyde groups or aldehyde-bisulfite groups can be transformed partially with hydroxylamine into oxime groups, which may then be hydrogenated to form primary amino groups. The aldehyde or aldehyde-bisulfite groups can also be reacted partially with alcohols or thiols, especially low molecular weight aliphatic alcohols and low molecular weight aliphatic thiols, to form acetal or mercaptal groups, with hydrazines, for example hydrazine, phenylhydrazine, paranitrophenylhydrazine and the like to form hydrazone groups, with acid hydrazides to form acid hydrazide groups and with aniline to form Schiff bases. In like manner the aldehyde groups and aldehyde-bisulfite groups, which may still be present after the treatment with bases, can be transformed wholly or partially into the functional groups defined above. It is also possible to transform in the molecules of the highly polymeric hydroxycarboxylic acids obtained after the treatment with bases, part of the carboxyl groups into hydroxymethyl groups by reduction or hydrogenation (cf. U.S. Patent 2,840,617) or part of the hydroxymethyl groups into carboxyl groups by oxidation (cf. German Patent 1,063,-806). Alternatively, the hydroxymethyl groups as well as the carboxyl groups can be partially esterified, especially with low molecular weight aliphatic monocarboxylic acids or low molecular weight aliphatic alcohols.

For producing the highly polymeric hydroxycarboxylic acids used in the process of the invention it is suitable to treat the homopolymers of acrolein or methacrolein with bases. From among the copolymers there are chosen those of acrolein/methacrolein or those which contain, in addition to acrolein aand/or methacrolein, other polymerizable organic co-components, especially olefinically unsaturated esters, for example of acrylic acid with low molecular weight aliphatic alcohols, such as methyl and ethyl acrylate, furthermore maleic acid, fumaric acid, maleic anhydride and esters of vinyl alcohol, especially those with low molecular weight aliphatic carboxylic acids, for example vinyl acetate, and vinyl chloride.

Particularly suitable are homopolymers of acrolein or methacrolein in which, after the treatment with bases, at least about 5% and preferably at least about 10% of the aldehyde groups have undergone dismutation. In the copolymer of acrolein or methacrolein with the co-components defined above there shall be present such an amount of carbonyl groups capable of undergoing dismutation that the minimum ratio of the number of hydroxymethyl and carboxyl groups formed by dismutation to the total molecule is the same as that in the homopolymers defined above. In the copolymers, too, the aldehyde groups shall be as near to one another as possible so that the Cannizzaro reaction, which always takes place between two aldehyde groups, is not hindered for spatial reasons. The conditions are especially favorable in segment polymers. By the copolymerization components additional functional groups may be introduced into the macromolecule, for example ester groups, chlorine atoms or anhydride groups. The latter react in the treatment with bases to form the corresponding metal or ammonium carboxylate groups. Consequently, a wide variation of compounds can be produced, the properties of which can be adapted to the requirements in each case.

It is known that the aggregation effect of flocculating agents increases as the molecular weight augments. It is, therefore, advantageous to prepare the compounds of the invention from high molecular weight, preferably linear polymers or polymers having a small amount of branching, for example from polyacrolein or polymethacrolein having a molecular weight of at least 200,000. The copolymers, too, shall have at least this molecular weight. Compounds derived from a polyacrolein having a molecular weight of 500,000 and more show an especially favorable flocculating effect.

In products which are insufficiently soluble in water after the Cannizzaro reaction has taken place, the water-solubility can be improved by the introduction of groups imparting solubility. For example, free aldehyde groups still present can be transformed into the corresponding aldehyde-bisulfite groups with sulfurous acid, sodium bisulfate or sodium pyrosulfite.

The bases preferably used for dismutation shall be so strong that their dissociation constant at 25° C. is higher than that of ammonium hydroxide at the same temperature. There can be used water-soluble hydroxides and basic salts of the alkali metals, especially of sodium, potassium and lithium. There can also be used strong organic bases, especially alkylamines such as triethylamine, diisopropylamine, diisobutylamine or benzylamine.

The suspensions which can be clarified by the process of the invention using the specified flocculating agents are, above all, waste waters containing, for example, carbon particles or mineral solids, such as clays or metal hydroxides, in suspended form and eventually in colloidal form. They are thus aqueous suspensions of solid particles which are clarified with the use of the flocculating auxiliaries according to the invention by sedimentation.

More particularly, the process of the invention is suitably carried out as follows: the flocculation auxiliary is added to the aqueous suspension in an amount of at least 0.1 mg. per liter and advantageously at least 2 mg. per liter, while stirring the suspension slowly by mechanical means or allowing it to flow not too rapidly with proper mechanical motion. The sediment is then allowed to deposit. The aforesaid amounts are added to suspensions containing, as is usual in practice, not more than 10 grams of solids per liter. If the suspension contains a higher proportion of solids a higher amount of flocculating agent must be added. With suspensions having a solid content of less than 10 grams per liter an addition of less than 10 milligrams of flocculating agent per liter of suspension is generally sufficient. The required amount can be readily determined in each case by a preliminary test.

The following examples serve to illustrate the invention, but they are not intended to limit it thereto.

*Example 1*

15.7 grams of a 35.8% polyacrolein (corresponding to 0.1 mol of aldehyde groups), prepared by redox polymerization of acrolein and having a molecular weight of 550,000, were dissolved with reflux in a solution of 19.0 grams (0.1 mol) of sodium pyrosulfite in 86 grams of water. A solution of 6.7 grams of sodium hydroxide in 373 grams of water was added at room temperature. The combined solutions turned strongly turbid. If necessary the pH of the mixture was adjusted to a value of 9.9 to 10.0. The reaction mixture was boiled with weak reflux until a pH value of 9.0 had adjusted after about 150 minutes. For neutralization 23 grams of 1 N hydrochloric acid were added and further 37 grams of water were added. A yellow solution was obtained which contained 1% of polyacrolein in the form of its dismutation product.

(*a*) 0.1 cc. of the above solution was added, while stirring slowly, to 500 cc. of an aqueous kaolin suspension having a solid content of about 5 grams per liter, as occurring, for example, in porcelain and earthen-ware industries. After the addition of the flocculating agent the turbid suspension contained about 2 milligrams thereof per liter. The sedimentation of the finely divided kaolin was substantially accelerated; after 5 minutes the main quantity had deposited. In a sample of the same suspension which had not been treated with the flocculation auxiliary, a sedimentation could not be observed under identical conditions.

(*b*) An aqueous chromic hydroxide suspension having a solid content of about 6 grams per liter, as obtained, for example, when chromate-containing waste waters are detoxicated, was clarified under the conditions specified (sub *a*) with 1–2 milligrams of flocculation auxiliary (polyacrolein dismutation product) per liter of suspension. The main quantity of the chromic hydroxide had deposited after 2 minutes, while no sedimentation could be observed in an untreated sample of the same suspension.

(*c*) Finely dispersed iron hydroxide formed in the neutralization of pickling liquors could be well separated from its aqueous suspension (1.5 grams of solid content per liter) with 2 milligrams of the above mentioned flocculating agent per liter of suspension. The sedimentation was complete after 3 minutes, while an untreated sample showed hardly any change under identical conditions.

*Example 2*

A solution of 1.80 grams (0.025 mol) of hydroxylamine-hydrochloride and 8.0 grams (0.2 mol) of sodium hydroxide in 350 cc. of water was added to the bisulfite solution of polyacrolein described in Example 1 and the whole was heated for 20 hours with reflux. 80 grams of water were added and the solution was filtered. A golden brown solution was obtained containing 1% of polyacrolein in the form of its dismutation product having, besides hydroxyl groups and carboxyl groups, aldehyde groups transformed into oxime groups.

The suspensions used in Examples 1(*a*), (*b*) and (*c*) could be rapidly clarified with 2 milligrams per liter of the product obtained. Smaller or larger amounts of flocculating agent, for example in the range of from 0.5 to 5 milligrams per liter of suspension, likewise gave good results.

*Example 3*

A solution of 6.7 grams of sodium hydroxide in 320 grams of water was run into the bisulfite solution of polyacrolein used in Example 1 and the mixture was heated for 2 hours with reflux. 1.53 grams of p-nitrophenyl hydrazine were added and the whole was heated further for 30 minutes with reflux, neutralized with 34 cc. of 1 N hydrochloric acid and 36 cc. of water were added. A light brown solution was obtained containing 1% of polyacrolein in the form of its dismutation product and having, besides hydroxyl groups and carboxyl groups, aldehyde groups transformed into p-nitrophenyl-hydrazone groups.

The suspensions used in Examples 1(*a*), (*b*) and (*c*) could be rapidly clarified with the solution obtained, adding the same amounts as in Example 2.

We claim:
1. A process for clarifying an aqueous suspension of solid particles by sedimentation, which comprises adding to the slowly agitated suspension as flocculation auxiliary a water-soluble highly polymeric hydroxycarboxylic acid obtained by treating a substance selected from the group consisting of polyacrolein, polymethacrolein, a copolymer of acrolein and a copolymer of methacrolein with a strong base, allowing the disperse matter to settle out, and separating the liquid from the sediment.

2. The process of claim 1, which comprises adding the highly polymeric hydroxycarboxylic acid in an amount of 0.1 to 10 milligrams per liter of suspension.

3. The process of claim 1, which comprises using a highly polymeric hydroxycarboxylic acid having a molecular weight of at least 200,000.

4. The process of claim 3, which comprises using a highly polymeric hydroxycarboxylic acid having a molecular weight of at least 500,000.

5

5. The process of claim 1, which comprises using a highly polymeric hydroxycarboxylic acid which contains additional functional groups selected from the groups consisting of aldehyde, aldehyde-bisulfite, acetal, mercaptal, oxime, hydrazone, primary amino, ester groups, chlorine atoms, metal carboxylate groups and ammonium carboxylate groups.

6. The process of claim 1, which comprises using bases the dissociation constant of which at 25° C. is greater than that of ammonium hydroxide at the same temperature.

7. The process of claim 1 wherein as the water-soluble highly polymeric hydroxycarboxylic acid is used a compound obtained by treating polymeric acrolein with a strong base, in which treatment at least 5% of the aldehyde groups of said polymeric acrolein have been transformed by dismutation into hydroxymethyl and carboxyl groups.

8. The process of claim 1 wherein as the water-soluble highly polymeric hydroxycarboxylic acid is used a compound obtained by treating polymeric methacrolein with a strong base, in which treatment at least 5% of the aldehyde groups of said polymeric methacrolein have been transformed by dismutation into hydroxymethyl and carboxyl groups.

References Cited by the Examiner
UNITED STATES PATENTS
2,554,973   5/1951   Ballard et al. _____ 260—67

MORRIS O. WOLK, *Primary Examiner.*